(12) United States Patent
Miyashita (10) Patent No.: US 6,327,482 B1
(45) Date of Patent: Dec. 4, 2001

(54) MOBILE RADIO APPARATUS WITH AUXILIARY DISPLAY SCREEN

(75) Inventor: Toshikazu Miyashita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/320,540

(22) Filed: May 27, 1999

(30) Foreign Application Priority Data

May 28, 1998 (JP) .................................................. 10-147043

(51) Int. Cl.$^7$ ................................ H04B 1/38; H04B 1/08; G09G 5/00; G09G 3/36; G09G 3/34
(52) U.S. Cl. ......................... 455/566; 455/556; 455/349; 345/5; 345/108; 345/102; 345/864; 345/901; 345/902; 345/903
(58) Field of Search .............................. 455/566, 90, 575, 455/349, 556; 379/433, 434; 345/102, 30, 5, 90, 108, 156, 173, 169, 784–787, 835, 902, 903, 864

(56) References Cited

U.S. PATENT DOCUMENTS

| | | | |
|---|---|---|---|
| 5,414,444 | * | 5/1995 | Britz ..................................... 345/156 |
| 5,508,720 | * | 4/1996 | DiSanto et al. ...................... 345/169 |
| 5,896,575 | * | 4/1999 | Higginbotham et al. ............ 455/566 |
| 6,085,112 | * | 7/2000 | Kleinschmidt et al. ............. 455/556 |
| 6,088,220 | * | 7/2000 | Katz .................................... 361/680 |
| 6,107,988 | * | 8/2000 | Philipps .............................. 345/156 |
| 6,144,358 | * | 11/2000 | Narayanaswamy et al. ........ 345/102 |

FOREIGN PATENT DOCUMENTS

| | | | |
|---|---|---|---|
| 0 539 699 A2 | * | 5/1993 | (EP) . |
| 0 817 393 A2 | * | 1/1998 | (EP) . |
| 2 318 944 A | * | 5/1998 | (GB) . |
| 2 328 343 A | * | 2/1999 | (GB) . |
| 5-59517 | | 8/1993 | (JP) . |
| 7-64523 | | 3/1995 | (JP) . |
| 8-223332 | | 8/1996 | (JP) . |
| 8-256098 | | 10/1996 | (JP) . |
| 9-37015 | | 2/1997 | (JP) . |
| 9-247250 | | 9/1997 | (JP) . |
| 9-247265 | | 9/1997 | (JP) . |
| 9-258705 | | 10/1997 | (JP) . |
| 11-249596 | | 9/1999 | (JP) . |
| WO 96/35288 | * | 11/1996 | (WO) . |
| WO 98/19435 | * | 5/1998 | (WO) . |

* cited by examiner

Primary Examiner—Tracy Legree
(74) Attorney, Agent, or Firm—McGuireWoods LLP (57) ABSTRACT

A mobile radio apparatus of the present invention includes an apparatus body having a connector portion at one side thereof. A main display is mounted on the apparatus body. An auxiliary display includes a terminal portion and is removably connected to the side of the apparatus body with the terminal portion mating with the connector portion of the apparatus body. The auxiliary display connected to the apparatus body assists the main display in displaying data at the time of, e.g., transmission or receipt. When the apparatus is carried by the user, the auxiliary display is dismounted from the apparatus body. The apparatus therefore achieves a great display capacity without being increased in size.

12 Claims, 8 Drawing Sheets

MOBILE RADIO APPARATUS WITH AUXILIARY DISPLAY SCREEN

BACKGROUND OF THE INVENTION

The present invention relates to a mobile radio apparatus including a display and more particularly to a handy phone, PHS (Personal Handy phone System) or similar mobile radio apparatus capable of increasing the amount of data to appear on its display.

A mobile radio apparatus of the kind described usually includes a display implemented by an LCD (Liquid Crystal Display). The display is capable of displaying the telephone number of the radio apparatus and that of the other party or messages or similar text data, as distinguished from speeches, at the time of connection and during conversation. Today, the amount of data to appear on the display is increasing due to the addition of advanced functions to the radio apparatus.

Generally, only four lines each including about twenty characters are available with the above display for displaying data. When the amount of data to be displayed exceeds the above limit, the user of the radio apparatus scrolls the screen of the display. However, the scrolling operation is troublesome to perform. Moreover, the user may fail to follow the scrolling speed of the display. While the area of the display may be increased in order to obviate the scrolling operation, such a scheme would make the radio apparatus too bulky to be applicable to, e.g., a handy phone needing a small size, light weight configuration.

Technologies relating to the present invention are disclosed in, e.g., Japanese Patent Laid-Open Publication Nos. 7-64 523, 8-223 332, 8-256 098 and 9-247 265.

SUMMARY OF THE INVENTION

It is therefore an object of the present invention to provide a mobile radio apparatus capable of increasing the amount of data to appear on a display without having its body increased in size.

A mobile radio apparatus including an apparatus body of the present invention includes a main display mounted on the front of the apparatus body for displaying various kinds of data, and an auxiliary display connectable to or movably mounted on the apparatus body for assisting the main display in displaying the data.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Preferred embodiments of the mobile radio apparatus in accordance with the present invention will be described hereinafter. The illustrative embodiments each are implemented as a digital handy phone by way of example.

Figure 1:
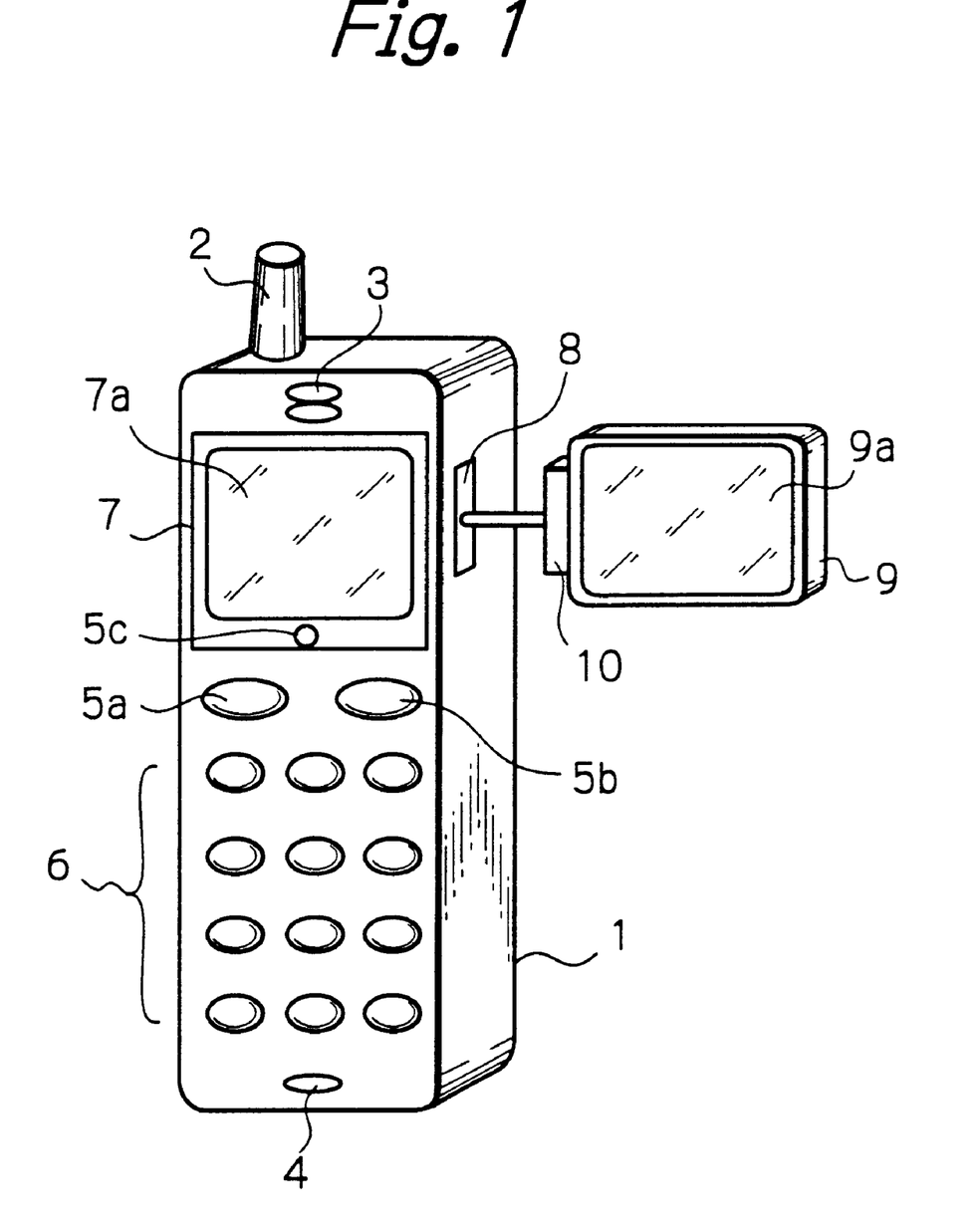
FIG. 1 is an external perspective view showing a mobile radio apparatus embodying the present invention.

Referring to FIG. 1 of the drawings, a mobile radio apparatus embodying the present invention includes an apparatus body 1. A transmission/receipt antenna 1 protrudes from the top of the apparatus body 1. Arranged on the apparatus body 1 are a miniature speaker or receiver 3, a microphone 4, a start button 5a for starting connecting the apparatus to a remote station, an end button 5b for ending the connection, an alarm lamp 5c for urging the user of the apparatus to use an auxiliary display 9 which will be described later, and numeral keys and various function keys 6. A main display 7 is mounted on the apparatus body 1 and includes a screen 7a implemented by an LCD. Specifically, the main display 7 is affixed to the panel surface of the apparatus body 1. A connector portion 8 is formed on one side of the apparatus body 1.

The auxiliary display 9 mentioned above has a screen 9a on its front that is also implemented by an LCD. A terminal portion 10 connectable to the connector portion 8 is arranged on one side of the auxiliary display 9. When the terminal portion 10 is inserted into the connector portion 8, the auxiliary display 9 is electrically connected to the apparatus body 1 and capable of displaying data in the same manner as and at the same time as the main display 7 on its screen 9a. The auxiliary display 9 may be removed from the apparatus body 1 and received in, e.g., the rear or the side of the apparatus body 1 when the display 9 is not necessary or when the apparatus body 1 is carried by the user.

Figure 2A:
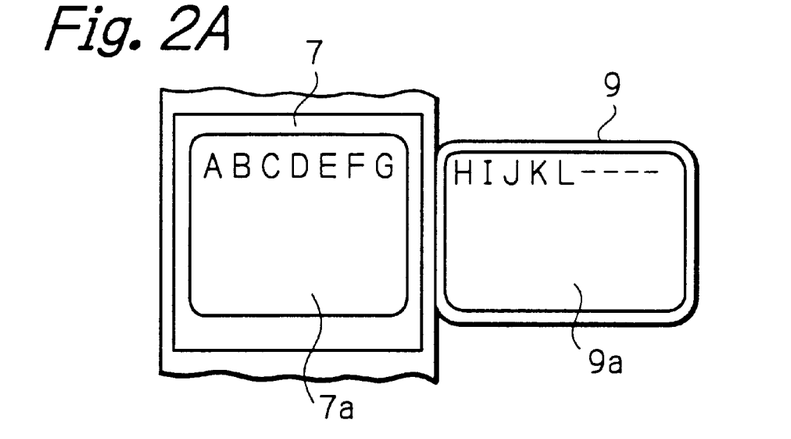
FIGS. 2A–2C are views each showing a particular mode in which a main display and an auxiliary display included in the embodiment of FIG. 1 display data thereon.
Figure 2B:
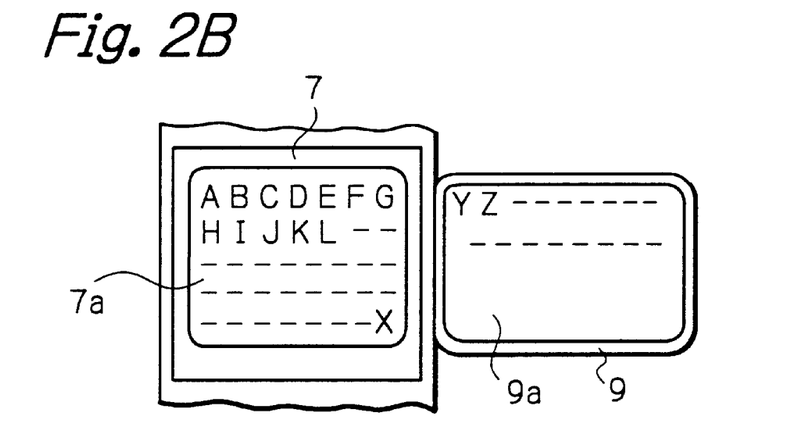
Figure 2C:
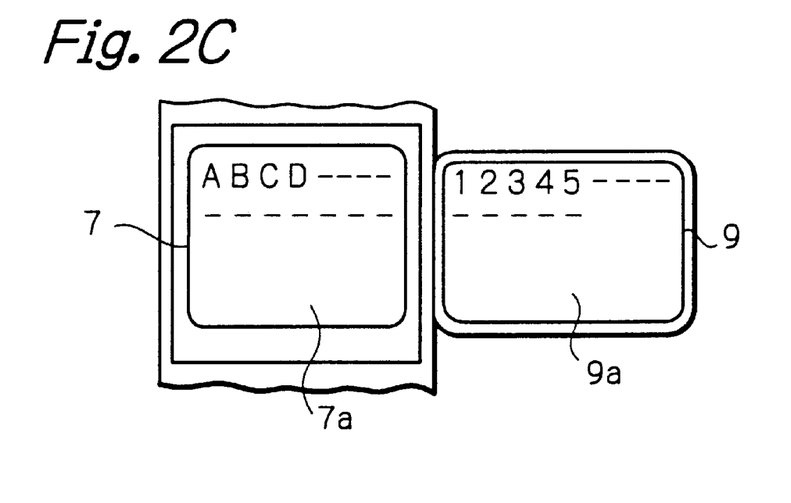

FIGS. 2A–2C each show particular mode in which the main display 7 and auxiliary display 9 display data. In FIG. 2A, the main display 7 and auxiliary display 9 constitute a single horizontally long screen in combination; data on a single line appear on the screens 7a and 9a in the form of aligned segments. In FIG. 2B, data overflown the screen 7a, but continued from the data appearing on the screen 7a, appear on the screen 9a, i.e., data is displayed in two consecutive pages. In FIG. 2C, the screens 7a and 9a constitute a multi display displaying data different in kind or content in parallel. In this manner, so long as the two displays 7 and 9 have the same specifications as each other, the display area available with the apparatus body 1 can be doubled without increasing the size of the apparatus body 1.

Figure 3A:
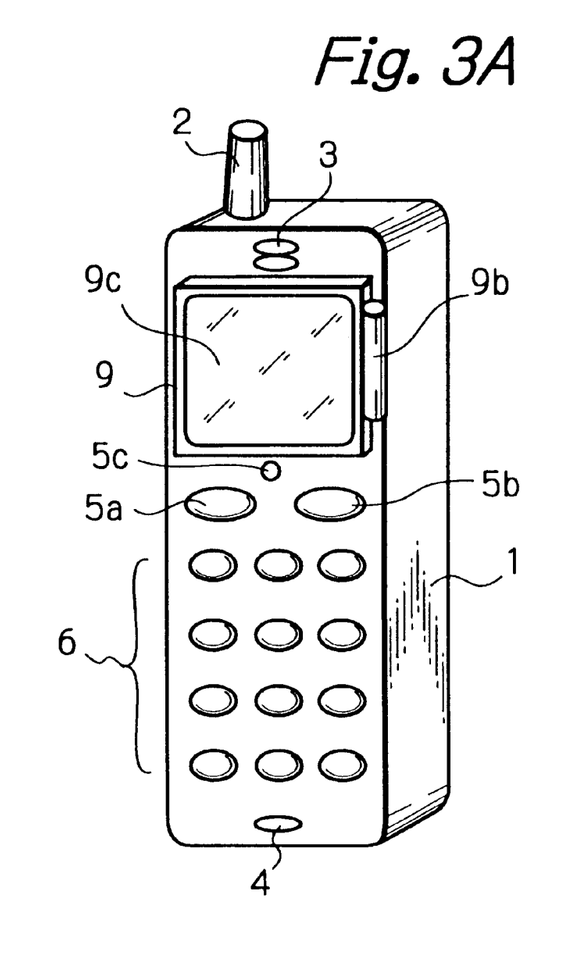
FIGS. 3A and 3B are external perspective views showing an alternative embodiment of the present invention.
Figure 3B:
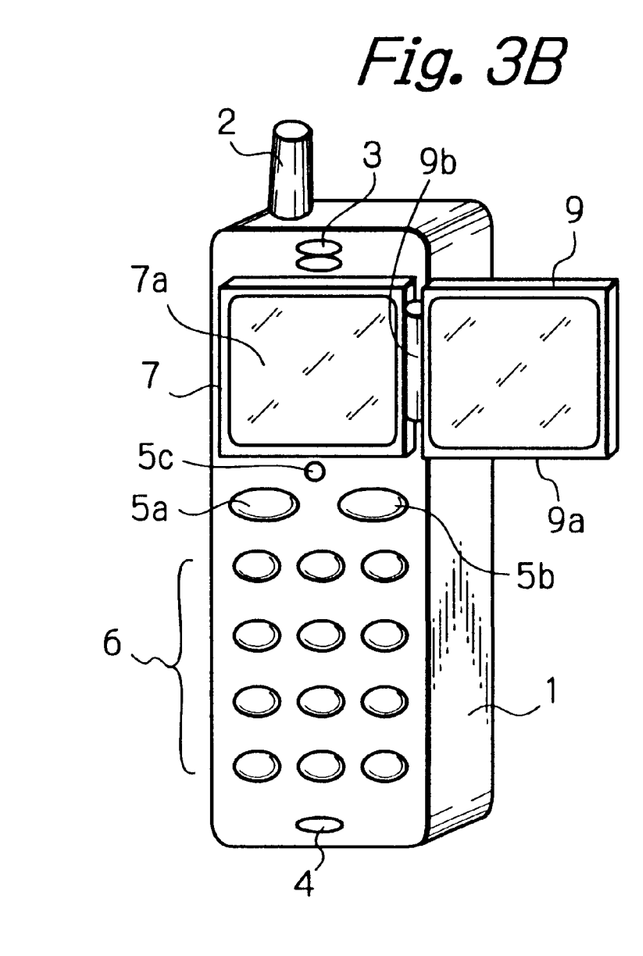

Reference will be made to FIGS. 3A and 3B for describing an alternative embodiment of the present invention. As shown, in the illustrative embodiment, the apparatus body 1 has a hinge portion 9b in the vicinity of its one side edge. The auxiliary display 9 is unfoldable, or openable, away from the apparatus body 1 about the hinge 9b. The screen 9a and a screen 9c also implemented by an LCD are respectively mounted on the front and the rear of the auxiliary display 9. FIG. 3A shows the auxiliary display 9 folded with its screen 9a overlying the main display 7. Even when the auxiliary display 9 is held in its folded position, the user can see data appearing on the screen 9c, i.e., the auxiliary display 9 plays the role of the main display 7. FIG. 3B shows the auxiliary display 9 in an unfolded position; data appear on both of the screens 7a and 9a. With this configuration, this embodiment achieves the same advantage as the previous embodiment.

Figure 4A:
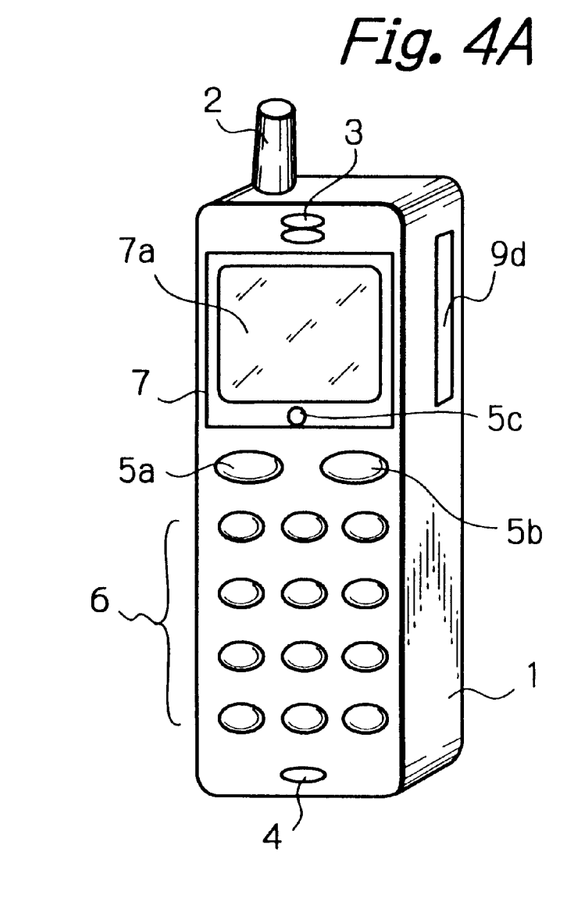
FIGS. 4A and 4B are external perspective views showing another alternative embodiment of the present invention.
Figure 4B:
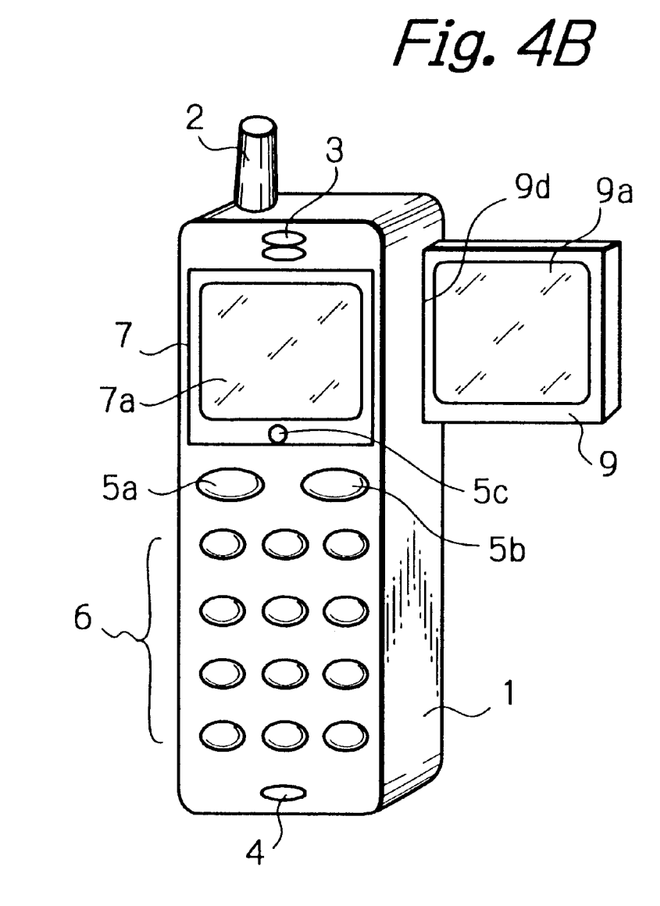

FIGS. 4A and 4B show another alternative embodiment of the present invention. As shown, the apparatus body 1 is configured to accommodate the auxiliary display 9 thereinside. Specifically, the apparatus body 1 is formed with a storing portion 9d for storing the auxiliary display 9 in its one side. FIG. 4A shows the auxiliary display 9 retracted into the storing portion 9d while FIG. 4B shows it pulled out of the storing portion 9d to a preselected position where the whole screen 9a appears. Connectors, not shown, are arranged in the auxiliary display 9 and apparatus body 1 such that the display 9 and apparatus body 1 are electrically connected together when the display 9 is pulled out to the above position. In the position shown in FIG. 4B, both the main display 7 and auxiliary display 9 are visible and can therefore display a great amount of data in combination.

Figure 5:
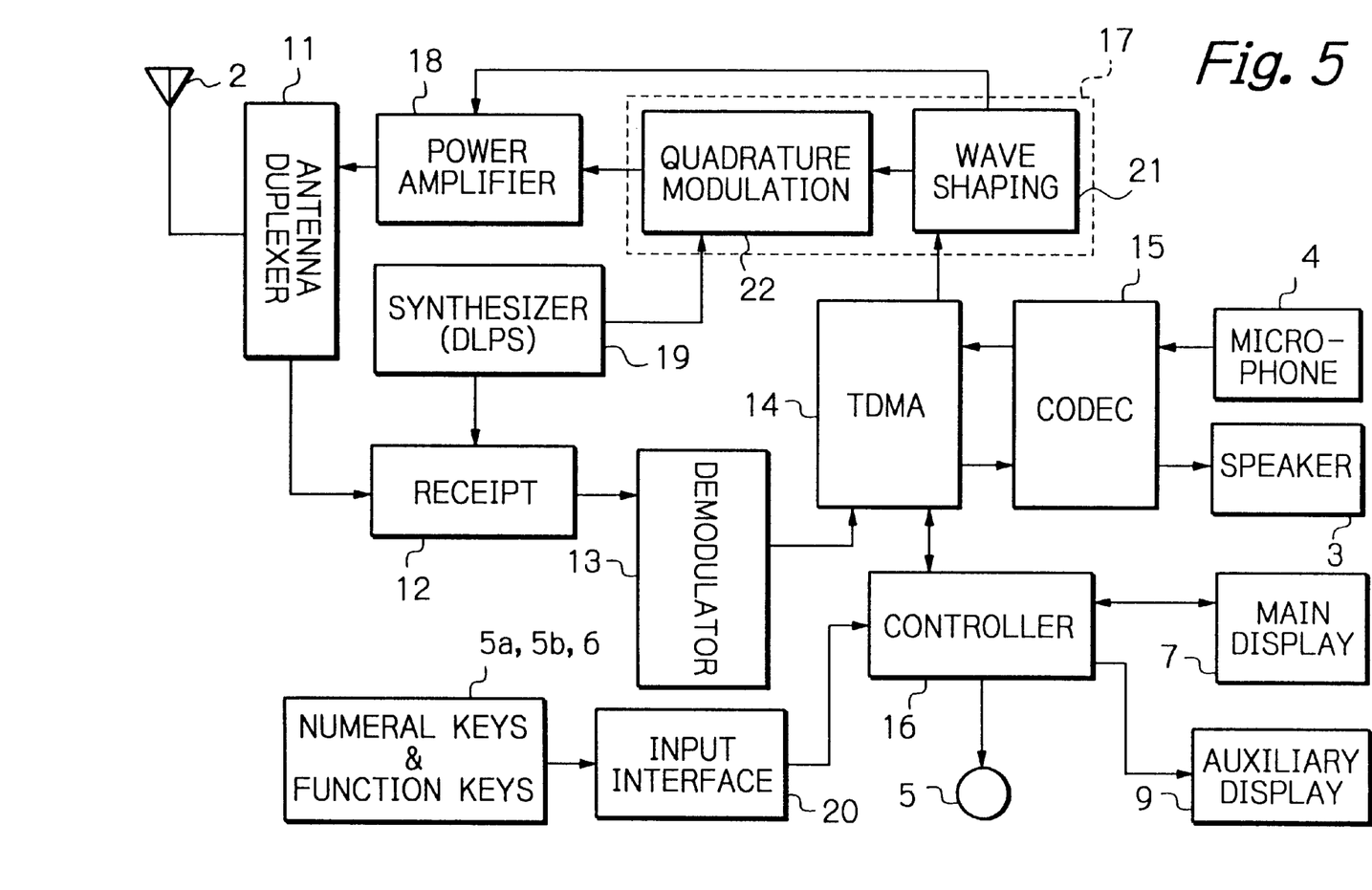
FIG. 5 is a block diagram schematically showing electric circuitry arranged in the mobile radio apparatus in accordance with the present invention.

FIG. 5 shows electric circuitry arranged in the mobile radio apparatus in accordance with the present invention. As shown, the circuitry includes an antenna duplexer 11 connected to the antenna 2. A receipt 12 is connected to the antenna duplexer 11 for executing amplification and other processing with a received signal. A demodulator 13 demodulates a signal output from the receipt 12. A TDMA (Time Division Multiple Access) 14 is connected to the demodulator 13. A CODEC (Coder/Decoder) 15 is connected to the TDMA 14 for coding a received speech or decoding a speech to be sent. A controller 16 includes a CPU (Central Processing Unit) and semiconductor memories, although not shown specifically. A QPSK (Quadrature Phase Shift Keying) modulator 17 is connected to the TDMA 14 and uses a π/4 QPSK demodulation scheme in the illustrative embodiment. A power amplifier 18 is connected to the antenna duplexer 11 and QPSK modulator 17. A synthesizer 19 switches over the transmission side and receipt side of the circuitry to each other at high speed. The synthesizer 19 is implemented by a DLPS (Digital Loop Preset Synthesizer). The speaker 3 and microphone 4 are connected to the CODEC 15. An LED (Light Emitting Diode) or lamp 5 and the main display 7 and auxiliary display 9 are connected to the controller 16.

The numeral keys 6 are connected to an input interface 20 that is, in turn, connected to the controller 16. The QPSK modulator 17 is made up of a wave shaping 21 and a quadrature modulation 22. The wave shaping 21 shapes the waveform of a signal output from the TDMA 14 while the quadrature modulation 22 modulates the output of the wave shaping 21 with the π/4 QPSK modulation scheme.

The operation of the circuitry shown in FIG. 5 will be described hereinafter. To originate a call, the user of the apparatus inputs the phone number of a desired destination on the numeral keys 6 or calls it stored in the memory of the controller 16. The phone number input or called appears on the main display 7 or the auxiliary display 9. Subsequently, the user presses the start button 5a positioned on the panel surface of the apparatus body 1. In response, the controller 16 activates the transmission system including the TDMA 14, QPSK modulator 17, power amplifier 18 and antenna duplexer 11 and thereby starts sending the telephone number (tone signal). At this instant, the synthesizer 19 switches over the transmission side and receipt side at a preselected timing so as to allow the apparatus to receive a response from the destination via a base station and to send its own signal. After connection has been set up between the apparatus and the destination, a signal coming in through the antenna 2 is routed through the antenna duplexer 11, receipt 12, demodulator 13, TDMA 14 and CODEC 15 to the speaker 3. A user's speech input to the microphone 4 is delivered to the antenna 2 via the CODEC 15, TDMA 14, QPSK modulator 17, power amplifier 18 and antenna duplexer 11 and radiated to the space.

When the apparatus receives a call, a connection signal received via the antenna 2 is routed through the antenna duplexer 11, receipt 12, demodulator 13, TDMA 14 and controller 16 to the main display 7 (or the auxiliary display 9). As a result, the phone number of the calling station is displayed on the main display 7 (or the auxiliary display 9). A speech from the calling station is decoded by the CODEC 15 to a speech signal. The speaker 3 performs electric-to-acoustic conversion with the speech signal output form the CODEC 15.

The controller 16 performs control relating to the connection of the auxiliary display 9 to the apparatus body 1 shown in FIG. 1 or FIGS. 4A and 4B or the positions of the display 9 shown in FIGS. 3A and 38. As for the specific display modes shown in FIGS. 2A–2C, the controller 16 allows the user to select desired one of them on the numeral keys or function keys 6 or automatically selects one of them in accordance with a preselected program. For example, assume that the controller 16 determines that the amount of data to display is great and that the auxiliary display 9 should preferably be used together with the main display 7. Then, the controller 16 turns on the alarm lamp 5c in order to urge the user to mount the auxiliary display 9 to the apparatus body 1 or set it in a preselected position.

Figure 6:
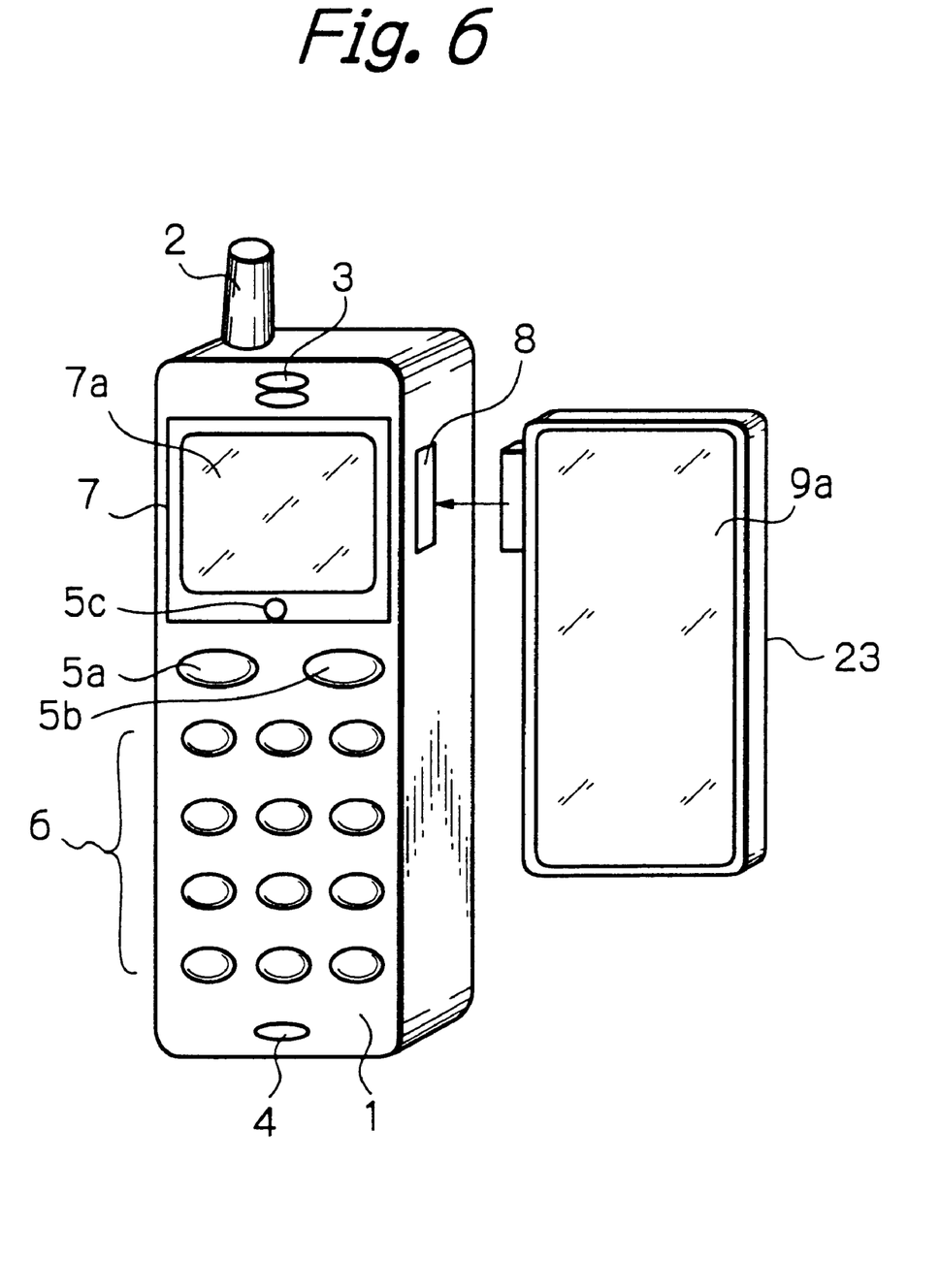
FIG. 6 is an external perspective view showing a further alternative embodiment of the present invention.

Mobile communication is attracting increasing attention in the portable telephone and PHS art. Assume that the user of the above radio communication apparatus outside of, e.g., a company receives data from the company or sends data to the company or receives data via Internet. Then, considering the great amount of data, the controller 16 urges the user to use both of the main display 7 and auxiliary display 9 and, if necessary, turns on the alarm lamp 5c. The capacity of the auxiliary display 9 of any one of the above embodiments may be too small to cope with the above situation. In light of this, as shown in FIG. 6, use may be made of an auxiliary display 23 having an area several times as great as the area of the auxiliary display 9 or even substantially identical with the area of the apparatus body 1 and removably mounted to the apparatus body. The crux is that the display size be variable in accordance with the amount of data to deal with, as desired.

Figure 7:
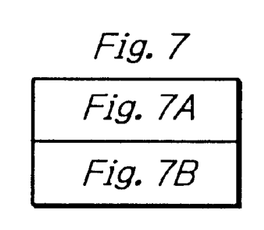
FIG. 7 is a flowchart demonstrating a specific operation of a controller included in the circuitry of FIG. 5 for controlling the main display and auxiliary display.
Figure 7A:
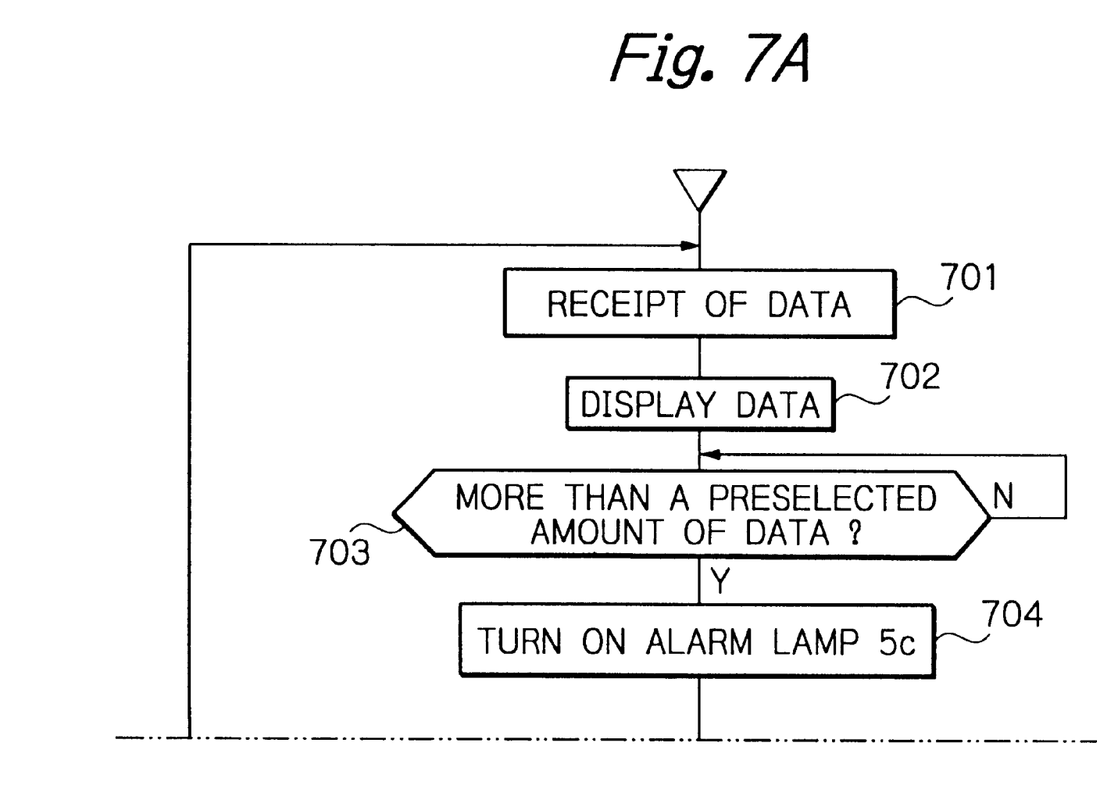
Figure 7B:
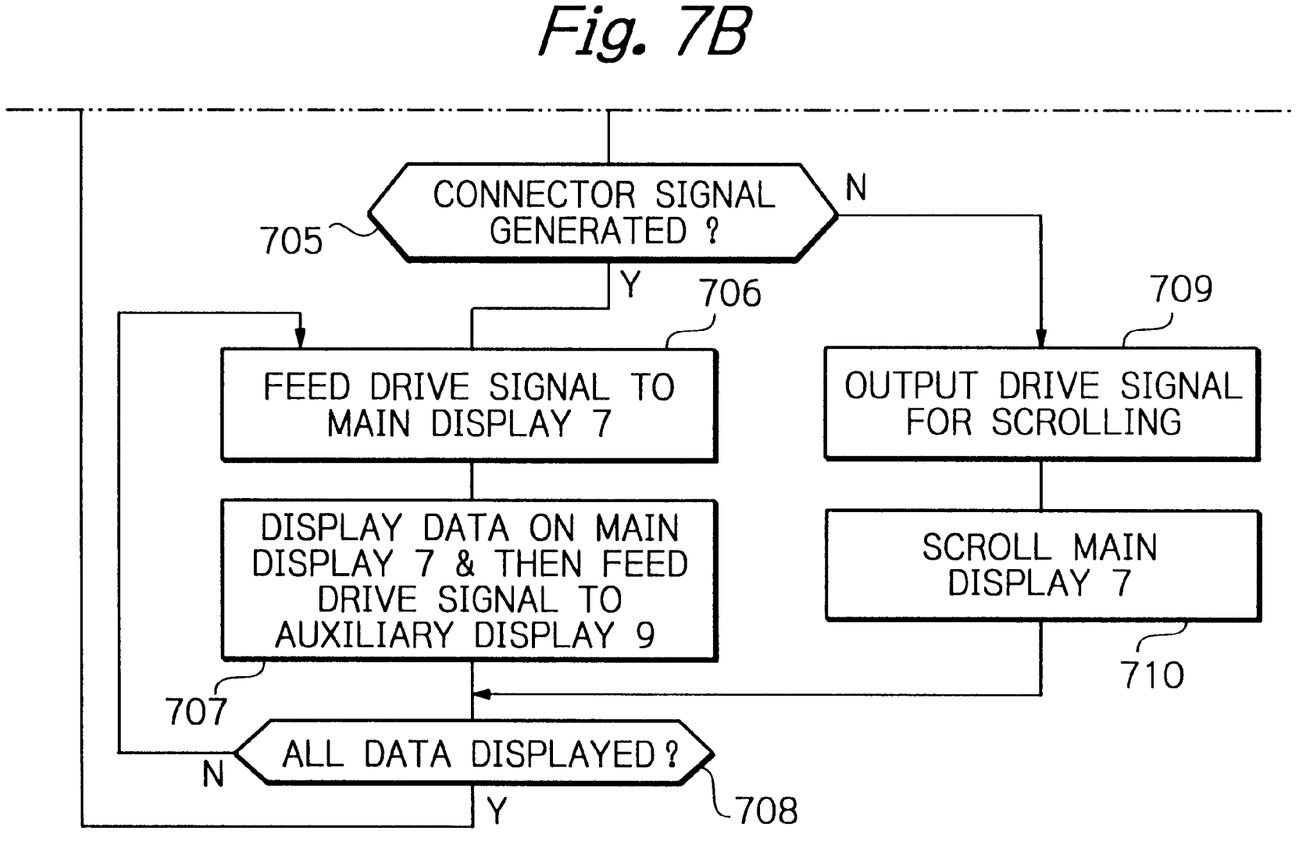

A specific operation of the controller 16 for controlling the main display 7 and auxiliary display 9 will be described with reference to FIG. 7. As shown, when text data or similar data to be displayed are received (step 701), the controller 16 causes the main display 7 to display the data (step 702). Assume that the amount of received data is greater than a preselected amount corresponding to the capacity of the main display 7 (Y, step 703). Then, the controller 16 turns on the alarm lamp 5c (step 704). Subsequently, the controller 16 determines whether or not a signal representative of the connection of the auxiliary display 9 to the apparatus body 1 (a connector signal) is generated in the main display 7 (step 705). If the answer of the step 705 is positive (Y), the controller 16 first delivers a drive signal to the main display 7 for causing it to start displaying the data (step 706).

As soon as the main display 7 overflows, the controller 16 drives the auxiliary display 9 connected to the apparatus body 1, causing it to start displaying the rest of the data (step 707). Subsequently, the controller 16 determines whether or not the data have been fully displayed on the two displays 7 and 9 (step 708). If the answer of the step 708 is Y, the controller 16 returns to the step 701. If the answer of the step 708 is negative (N), the controller 16 repeats the steps 706, 707 and 708 until the data have been fully displayed on the displays 7 and 9. Assume that the auxiliary display 9 is not connected to the apparatus body (N, step 705), i.e., only the main display 7 is available. Then, the controller 16 scrolls the screen 7a of the main display 7, i.e., returns to the first line every the last line is displayed (steps 709 and 710).

As stated above, the controller 16 automatically selects a display mode on the basis of whether or not the auxiliary display 9 on connected to the apparatus body 1. This allows received data to be displayed in the optimal manner.

In summary, in accordance with the present invention, a mobile radio apparatus includes an auxiliary display in addition to a main display mounted on the apparatus body. The radio apparatus can therefore display a far greater amount of data than conventional apparatuses at the time of, e.g., transmission or receipt. This makes it needless for the user of the radio apparatus to repeat a scrolling operation.

Further, because the auxiliary display is retracted into the apparatus body when not needed, the apparatus body is miniature and easy to carry in spite of the increased display capacity. In addition, the main display and auxiliary display are positioned in the same plane as each other and allow the user to easily see the data appearing thereon.

Various modifications will become possible for those skilled in the art after receiving the teachings of the present disclosure without departing from the scope thereof. For example, while the illustrative embodiments have concentrated on a handy phone, the present invention is, of course, applicable to PHS or even to any other kind of portable mobile ratio apparatus.

What is claimed is:

1. A mobile radio apparatus including an apparatus body, comprising:

a main display mounted on a front of said apparatus body for displaying various kinds of data; and an auxiliary display cantilevered from said apparatus body adjacent to said main display for assisting said main display in displaying the data such that when said data is read from left to right, a line of said data is contiguously displayed from said main display to said auxiliary display.

2. A mobile radio apparatus as claimed in claim 1, wherein said auxiliary display includes a terminal portion connectable to a connector portion included in said apparatus body.

3. A mobile radio apparatus as claimed in claim 1, wherein said auxiliary display is hinged to said apparatus body to be unfoldable away from said apparatus body.

4. A mobile radio apparatus as claimed in claim 3, wherein said auxiliary display has a first and a second screen on a front and a rear thereof, respectively, said second screen displaying, when said auxiliary display is folded, the data expected to appear on said main display.

5. A mobile radio apparatus as claimed in claim 1, wherein said apparatus body is formed with a storing section at a side thereof for accommodating said auxiliary display, said auxiliary display being electrically connected to said apparatus body when pulled out of said storing section to a preselected position.

6. A mobile radio apparatus as claimed in claim 1, wherein said auxiliary display includes a screen having a raster contiguous with a raster of a screen of said main display.

7. A mobile radio apparatus as claimed in claim 1, wherein when a screen of said main display overflows, said auxiliary display displays remaining data.

8. A mobile radio apparatus as claimed in claim 1, wherein said auxiliary display displays data different from the data to be displayed on said main display.

9. A portable radio device having a display capability, comprising:

a main body having a main display for displaying text and a control pad section for entering data into said portable radio device; and an auxiliary display for displaying text connectably positioned adjacent to said main display and cantilevered from said main body such that said main display and said auxiliary display form a single horizontally long screen.

10. A portable radio device having a display capability as recited in claim 9 wherein said auxiliary screen plugs into a port in a side of said main body.

11. A portable radio device having a display capability as recited in claim 10 wherein said auxiliary display slides into an opening in a side of said main body in a closed position.

12. A portable radio device having a display capability as recited in claim 9 wherein said auxiliary display is hinged to said main body and in a closed position closes on top of said main display.

* * * * *